US011755366B2

(12) United States Patent
Danilov et al.

(10) Patent No.: US 11,755,366 B2
(45) Date of Patent: Sep. 12, 2023

(54) PARALLEL HANDLING OF A TREE DATA STRUCTURE FOR MULTIPLE SYSTEM PROCESSES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 630 days.

(21) Appl. No.: 17/008,874

(22) Filed: Sep. 1, 2020

(65) Prior Publication Data
US 2022/0066820 A1 Mar. 3, 2022

(51) Int. Cl.
*G06F 16/22* (2019.01)
*G06F 9/48* (2006.01)
*G06F 16/2455* (2019.01)
*G06F 16/23* (2019.01)

(52) U.S. Cl.
CPC ........ *G06F 9/4881* (2013.01); *G06F 16/2246* (2019.01); *G06F 16/2365* (2019.01); *G06F 16/24562* (2019.01); *G06F 2209/486* (2013.01)

(58) Field of Classification Search
CPC ............... G06F 9/4881; G06F 16/2246; G06F 16/2365; G06F 16/24562; G06F 2209/486; G06F 16/13
See application file for complete search history.

(56) References Cited

U.S. PATENT DOCUMENTS

| 2013/0205197 | A1* | 8/2013 | O'Neill | G06F 40/117 |
| | | | | 715/236 |
| 2016/0070767 | A1* | 3/2016 | Karras | G06T 15/80 |
| | | | | 707/602 |
| 2017/0004164 | A1* | 1/2017 | Tucek | G06F 16/2315 |
| 2017/0083549 | A1* | 3/2017 | Danilov | G06F 16/2329 |
| 2018/0004786 | A1* | 1/2018 | Danilov | G06F 16/2329 |
| 2020/0265020 | A1* | 8/2020 | Gupta | G06F 3/061 |
| 2021/0064580 | A1* | 3/2021 | Gao | G06F 16/152 |
| 2022/0179828 | A1* | 6/2022 | Gupta | G06F 3/0604 |

* cited by examiner

*Primary Examiner* — Dong U Kim
(74) *Attorney, Agent, or Firm* — Amin, Turocy & Watson, LLP

(57) ABSTRACT

The technology describes scanning tree data structures (trees) for multiple processes, at least partly in parallel. A service scans a tree from a beginning tree element to an ending tree element on behalf of a process; while scanning, another process can join in the scan at an intermediate tree element location (e.g., a key). For the subsequent process, the service scans the tree based on the intermediate location to the tree end, thereby visiting tree elements in parallel until the tree end, then continuing from the tree beginning element to the intermediate location for the subsequent process. The service basically completes a full carousel-type revolution for each process. One or more other processes can join an ongoing scan at any time, facilitating further parallel tree element visits, while still obtaining a full scan of the entire set of tree elements. The service handles changing tree versions during the scanning.

20 Claims, 15 Drawing Sheets

PARALLEL HANDLING OF A TREE DATA STRUCTURE FOR MULTIPLE SYSTEM PROCESSES

TECHNICAL FIELD

The subject application generally relates to data storage, and, for example, to a data storage system that facilitates visiting tree data structure elements in parallel for processes, and related embodiments.

BACKGROUND

Contemporary cloud-based data storage systems, such as ECS (formerly known as ELASTIC CLOUD STORAGE) provided by DELL EMC, store system metadata in directory tables. Directory tables are typically large, and thus can be partitioned across multiple storage nodes/storage devices.

A directory table partition comprises a tree data structure, which is a version of a B+ tree data structure generally containing a root, internal nodes and leaves, in which each tree node contains only keys, with the leaves keeping key-value pairs. Such tree data structures (or simply trees) are relatively large so the major part of each tree resides in tree chunks on one or more hard drives or the like.

Trees need to be scanned to locate data for various purposes. However, the events that trigger a tree scan arrive independently, from different processes. It is typically undesirable to try and coordinate the commencement of independent system process scans of a tree, because there are usually certain penalties associated with a delayed start of a system process. This means that one tree is scanned multiple times, even if two such processes start their respective scans relatively closely in time to one another. This is an undesirable, resource-intensive operation because as set forth above, trees are typically large, with a major part of a tree normally residing on a hard drive.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
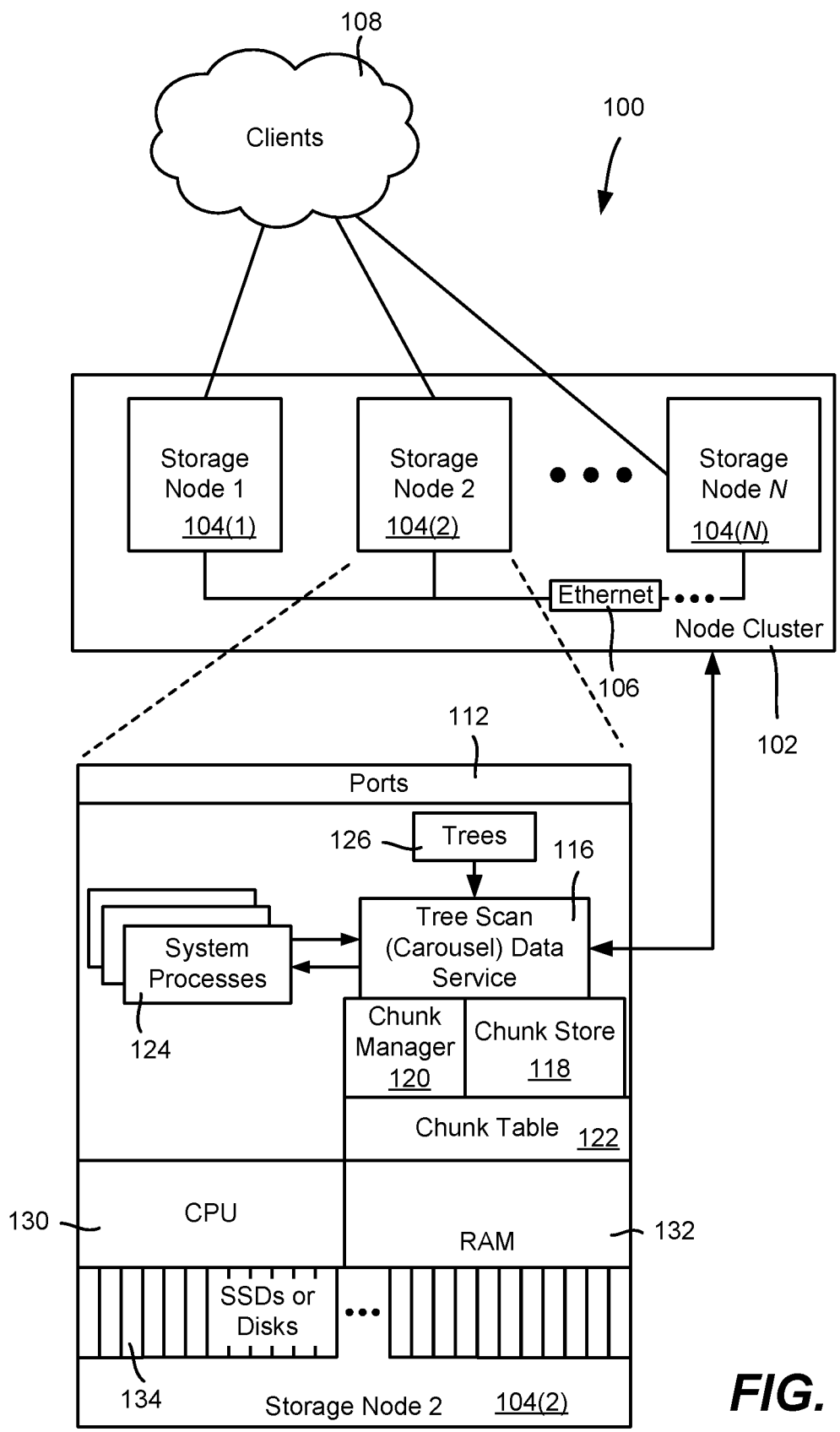
FIG. 1 is an example block diagram representation of part of a data storage system including nodes, in which a tree data structure (tree) can be scanned simultaneously on behalf of multiple system processes, in accordance with various aspects and implementations of the subject disclosure.

Various aspects of the technology described herein are generally directed towards parallel handling (e.g., scanning) of one tree data structure (tree) on behalf of multiple system processes. To this end, the system processes share one tree scanner when scanning a tree. In one implementation, the tree scanning component acts as a service, with the system processes being clients of the tree scanning service. There can be a tree scanning service instance per tree or type of tree, for example, with a process that needs tree scanning for a tree invoking or using an appropriate corresponding tree scanning service instance.

In one aspect, when a system process needs a tree scan and no scan of that tree is currently taking place, the technology operates to scan a tree on behalf of that first system process from the tree beginning to the tree end, including reporting on visited intermediate tree elements. If a second process requests a scan of the same tree before the scan is finished for the first process, the scan for the second process starts reporting on tree elements visited based on the current location of the first scan, e.g., from some point such as the middle of the tree. More particularly, in this example when the scan for the first process is at an intermediate tree element when the second process requests a scan, the scan for the second process begins at a location that is based on the current intermediate tree element's location (e.g., the next tree element thereafter). The scan is thus visiting tree elements in parallel for both processes, typically for relatively many tree elements. The scan and reporting for the first process ends at the tree end because the tree elements were fully visited for the first process, however instead of stopping at the tree end, the scan and corresponding reporting for the second tree process resumes from the tree start and ends at the intermediate tree element location so that the second process also has the full set of tree elements visited.

As long as any scan is ongoing, another process may join the scan based on the current intermediate tree element location (e.g., the next element after the last-scanned intermediate tree element), and so on. Indeed, if there is a constant inflow of new system processes, the scanning service may run in a nonstop mode. In this way, the technology described herein handles tree scanning without multiplication of system resource consumption (for typically many tree elements) that would otherwise occur with independent scanning.

As will be understood, the implementation(s) described herein are non-limiting examples, and variations in the technology can be implemented. For example, in ECS cloud storage technology the metadata is stored in tree data structures, however any data storage or other system that needs to scan trees may benefit from the present technology. Indeed, it should be understood that any of the examples herein are non-limiting. For instance, some of the examples are based on ECS cloud storage technology; however virtually any storage system may benefit from the technology described herein. Further, many of the examples refer to scanning tree leaves, however it is understood that any elements (e.g., intermediate nodes) of a tree can be scanned for more than one process in a single scan operation, referred to as "in parallel" with respect to visiting a tree element. Thus, any of the embodiments, aspects, concepts, structures, functionalities or examples described herein are non-limiting, and the technology may be used in various ways that provide benefits and advantages in computing and tree data structure processing in general.

FIG. 1 shows part of a cloud data storage system such as ECS comprising a zone (e.g., cluster) 102 of storage nodes 104(1)-104(N), in which each node is typically a server configured primarily to serve objects in response to client requests. The nodes 104(1)-104(N) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

In general, and in one or more implementations, e.g., ECS, disk space is partitioned into a set of relatively large blocks of typically fixed size (e.g., 128 MB) referred to as chunks; user data is generally stored in chunks, e.g., in a user data repository. Normally, one chunk contains segments of several user objects. In other words, chunks can be shared, that is, one chunk may contain segments of multiple user objects; e.g., one chunk may contain mixed segments of some number of (e.g., three) user objects. Tree data can also be maintained in tree chunks.

Each node, such as the node 104(2), includes an instance of a data storage system 114 and data services; (note however that at least some data service components can be per-cluster, or per group of nodes, rather than per-node). For example, ECS runs a set of storage services, which together implement storage business logic. A tree scan service 116 as described herein can be one such data service. Services can also maintain directory tables for keeping their metadata, which can be implemented as search trees; the data of search trees can be kept in tree chunk data structures. For example, a blob service can maintain an object table (one type of directory table) that keeps track of objects in the data storage system and generally stores the system objects' metadata, including an object's data location within a chunk. Note that the object table can be partitioned among the nodes 104(1)-104(N) of the cluster. There is also a "reverse" directory table (maintained by another service) that keeps a per chunk list of objects that have their data in a particular chunk.

FIG. 1 generalizes some of the above concepts, in that a data repository of chunk data structures, or simply chunks, is shown as a chunk store 118, managed by a chunk manager 120. A chunk table 122 maintains metadata about chunks.

Further, as described herein, system processes 124 are coupled to the tree scan data service 116 to scan the relevant trees 126, such as metadata search trees including directory tables. The object table and chunk table are updated to track the locations of the objects within the chunks of the data storage system.

In FIG. 1, a CPU 130 and RAM 132 are shown; note that the RAM 132 may comprise at least some non-volatile RAM. The node includes storage devices such as disks 134, comprising hard disk drives and/or solid-state drives. As is understood, any node data structure such as an object, object table, chunk table, chunk, code, and the like can be in RAM 128, on disk(s) 130 or a combination of partially in RAM, partially on disk, backed on disk, replicated to other nodes and so on.

Figure 2:
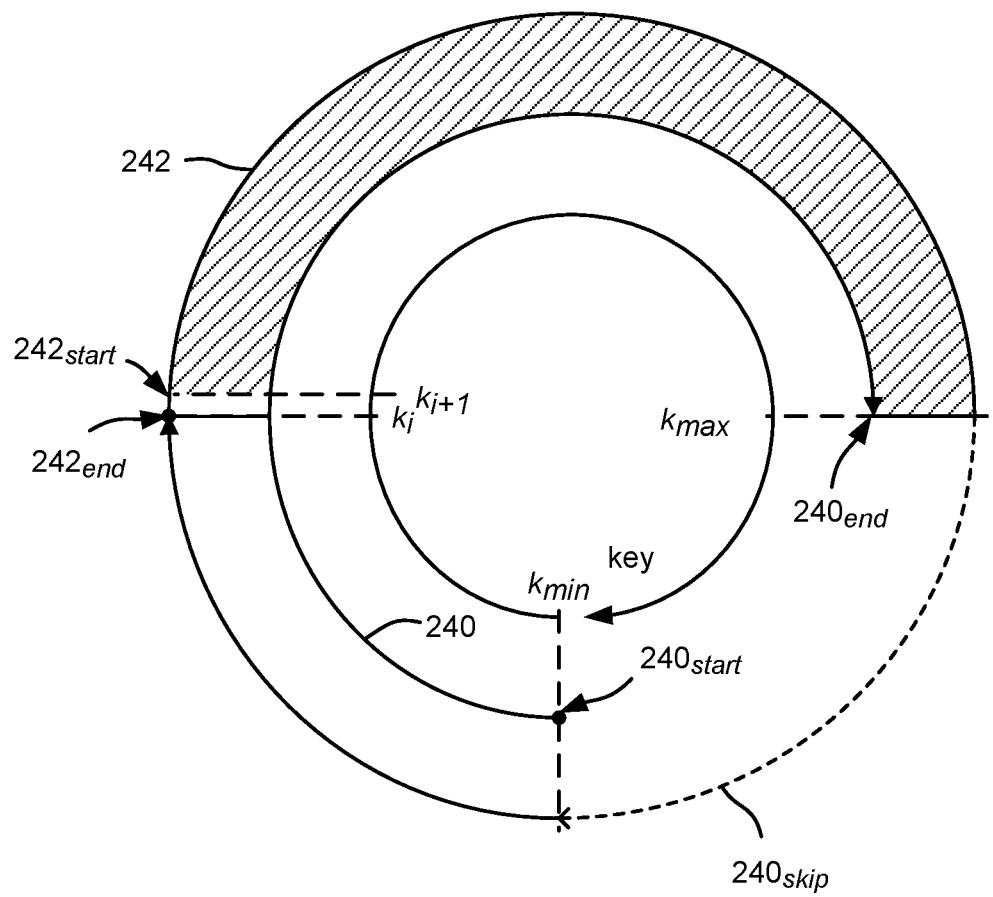
FIG. 2 is a representation of how a tree scanning service can be considered as a carousel service in which processes can jump on a scan and obtain a full revolution over tree elements, in accordance with various aspects and implementations of the subject disclosure.
Figure 3:
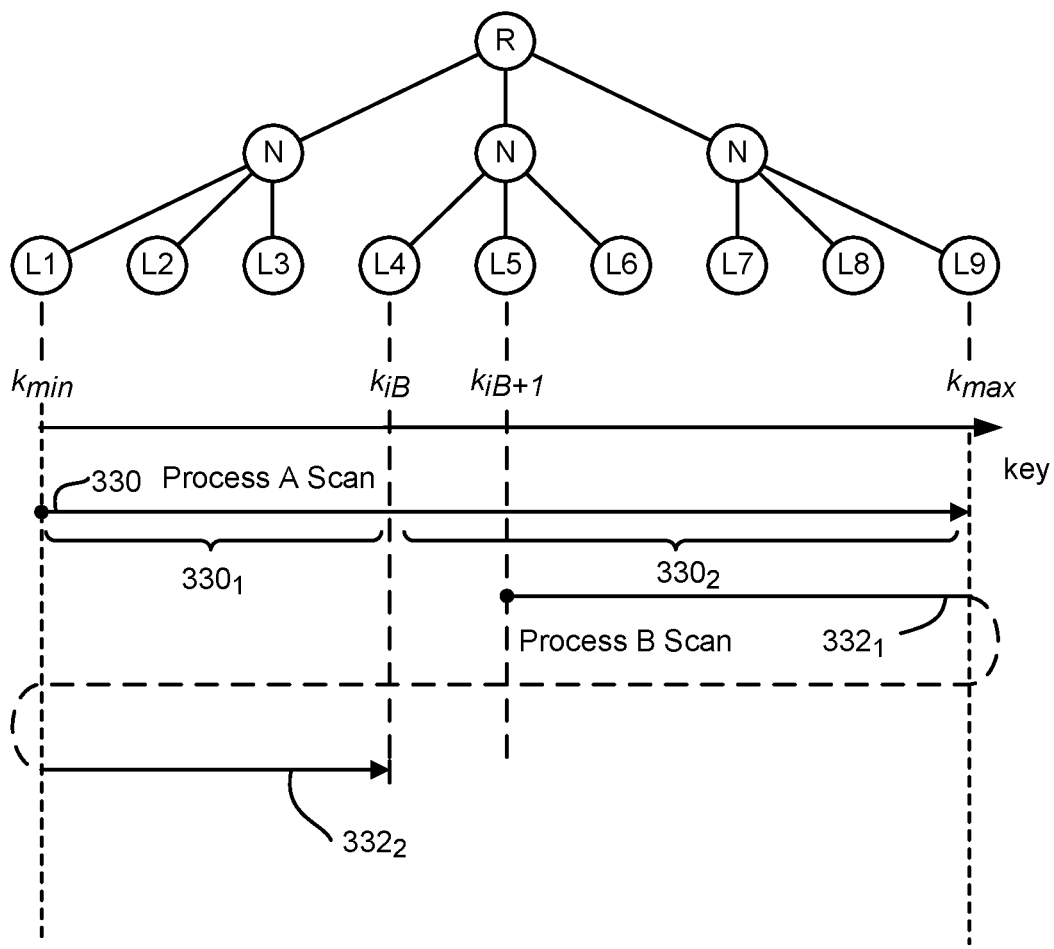
FIG. 3 is a representation of scanning a tree for two processes, including an initial process that starts a scanning service to scan the tree on its behalf, and a subsequent process that joins the scan, partly visiting some elements in parallel, in accordance with various aspects and implementations of the subject disclosure.

Turning to FIGS. 2 and 3, aspects can be understood by considering the tree scan data service operating on behalf of any process as a "circular revolution" (FIG. 2) with respect to a tree, in that a full traversal of tree elements occurs for each process, whereby an alternative name for the tree scanning service is a "carousel service." The carousel (tree scanning) service is idle when no system process needs to scan a tree.

In FIGS. 2 and 3, a tree starts at a beginning tree element, such as a key $k_{min}$ (one example type of a tree element is a key), and ends at an ending tree element, or key $k_{max}$. In one implementation, a carousel service uses depth-first traversal and reports keys in ascending order. For example, when a carousel service starts from the beginning of a tree, the carousel service can go directly from a tree root to a minimal key value $k_{min}$. When a carousel service completes a "lap," the carousel service finishes with a maximal key value $k_{max}$.

In FIG. 2, the carousel service starts a first tree traversal when a first system process needs to perform a tree scan, or full "revolution" over the tree element keys $k_{min}$ to $k_{max}$. This is represented in FIG. 2 by the (approximately 270 degrees) curved line labeled 240, from $240_{start}$ to $240_{end}$. During the revolution, a second system process can "jump on" the carousel service, and start based on the carousel service's current location within the tree at an intermediate tree element, key $k_i$. Thus, the second system process has the tree traversal performed by the carousel service as represented by the curved line labeled 242, beginning at the next intermediate tree element, key $k_{i+1}$ to key $k_{max}$, and from $k_{min}$ to $k_i$. The full set of relevant tree elements (keys) are thus visited for the second process, even though the traversal started somewhere other than the tree beginning point, namely at element $k_{i+1}$.

Thus, as represented by the shaded portion in FIG. 2, the first process and the second process share the tree scan service from the location $242_{start}$ to the location $240_{end}$. Note that as indicated by the dashed circular line $240_{skip}$, the scanning service skips back from the tree end $k_{max}$ to the tree beginning $k_{min}$ (or possibly the tree root that quickly reaches $k_{min}$) to resume the tree traversal on behalf of the second process. In other words, when the tree end $k_{max}$ is reached and the traversal for the first process has completed, scanning by the carousel service for the second process continues, resuming reporting from the tree element $k_{min}$ and ending at the intermediate location key $k_i$, which is last key that needs to be visited by the carousel service on behalf of the second process.

FIG. 3 shows another view of the carousel service with respect to a hierarchical tree of nodes and leaves L1-L9. Consider that in FIG. 3, at the moment the first process A needs a scan by the carousel service, the carousel service is idle. When triggered for a tree traversal by process A, the carousel service starts traversing to visit keys for the first process with the keys from $[k_{min}, k_{max}]$, as represented by the solid line 330, which can be considered a first partial traversal 3301 to an intermediate node $k_{iB}$, that is, from $[k_{min}, k_{iB}]$, plus a second partial traversal 3302 from $[k_{iB}, k_{max}]$. More particularly, at the moment the carousel service is handling the intermediate key $k_{iB}$, a second process B requests a traversal on behalf of the second process. The carousel does not restart from the beginning, but in parallel visits the keys from $[k_{iB+1}, k_{max}]$ (including the second partial traversal, in parallel, represented by the solid line 3421) for process B on behalf of both processes. The first process A "gets off of" the carousel service after $k_{max}$ has been handled, and the carousel service starts a second lap from $k_{min}$ that only visits keys on behalf of the second process, (as represented by a "third" partial traversal represented by the solid line 3322). After handling the keys from $[k_{min}, k_{iB}]$, the second process B gets off of the carousel service as well, whereby the carousel service stops after $K_{iB}$ before completing the full second lap.

It should be noted that an intermediate key $k_i$ (including $K_{iB}$) as described herein refers to the last key visited on behalf of a process currently using the scan service, whereby a next process has its traversal start from the next key, $k_{i+1}$. It is basically identical however, to consider that the intermediate key $k_i$ for a process currently using the scan service is the next to be visited (instead of the last one visited), whereby a second service would start in parallel from $k_i$ as well, and thus ends at the key that is before the intermediate key, that is, $k_{i-1}$.

With respect to efficiency, in the example of FIG. 3, consider that in general, resource consumption by a tree scanner is (for the most part) directly proportional to the number of keys the scanner visited. If only process A and process B were present, then, two independent tree scanners for the two processes A and B would visit eighteen keys (leaves L1 to L9, twice) in total. Sharing via the carousel service helps reduce the number of keys visited to thirteen, as five keys (L5 to L9) were visited while both process A and process B were active with respect to the carousel service, and thus visited in parallel by the carousel service. As can be readily appreciated, search trees in practice tend to be substantially larger than the tree of FIG. 2, and thus resource consumption can be greatly reduced by the implementation of a carousel service.

Figure 4:
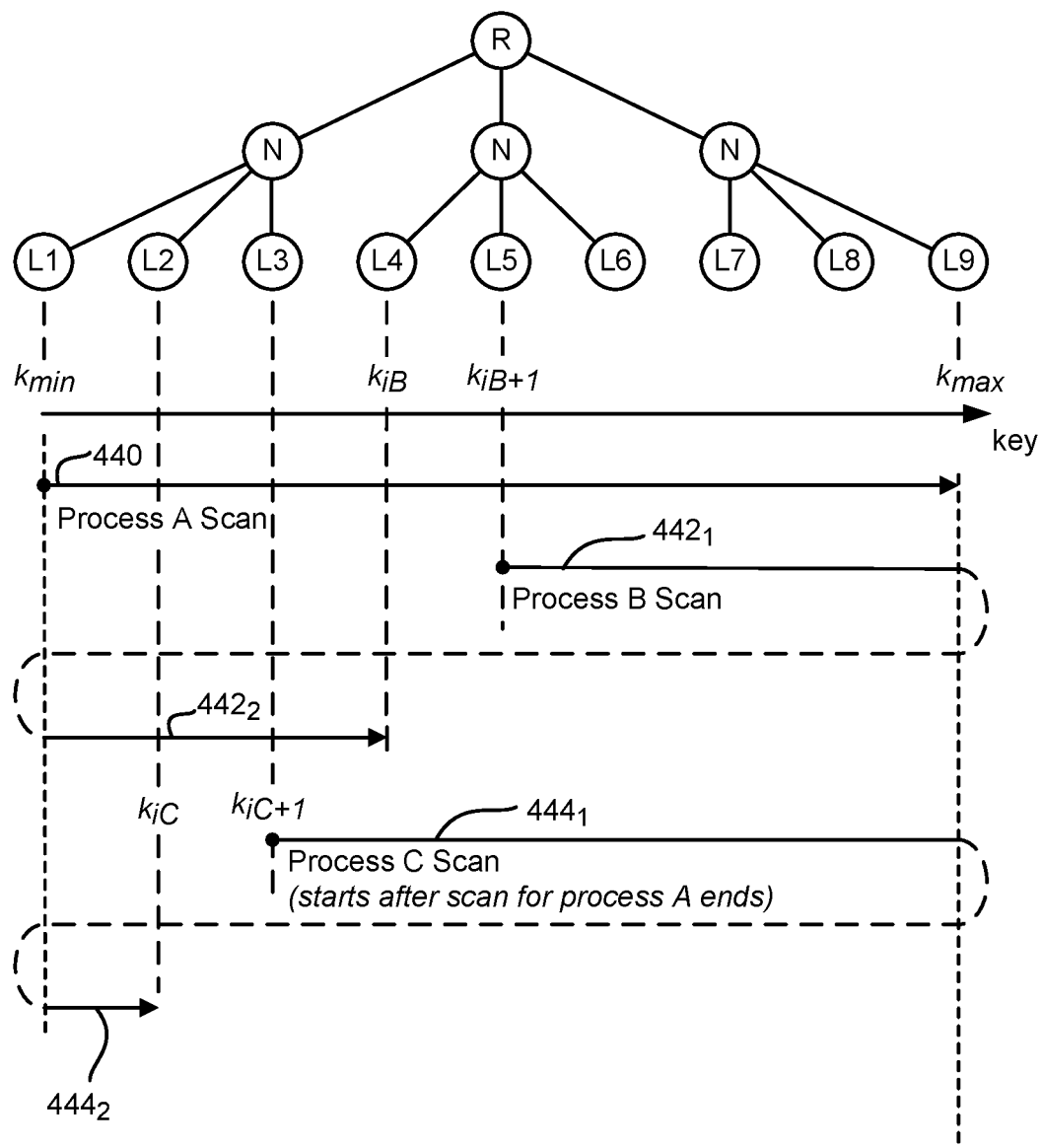
FIGS. 4 and 5 are representations of scanning a tree for three processes, including an initial process that starts a scanning service to scan the tree on its behalf, and subsequent processes that join the scan, partly visiting some tree elements in parallel, in accordance with various aspects and implementations of the subject disclosure.

FIG. 4 shows how this works for a third process as well, and by extension, for any number of processes that need a tree traversal while at least one other traversal is still taking place. In FIG. 4, a process A starts the carousel service, which was idle, and thus as represented by the solid line 440, the carousel service scans from $k_{min}$ to $k_{max}$ for process A.

While the scan A is at an intermediate key, a process B requests a scan, and thus the intermediate key is recorded as key $k_{iB}$, and the scan for the process B begins at the key $k_{iB+1}$. The tree scan for process B includes a first partial traversal from the key $k_{iB+1}$ to the tree ending location $k_{max}$ as represented by the line 4421, and a second partial traversal from the tree beginning location (corresponding to $k_{min}$) to the tree intermediate key location $k_{iB}$ as represented by the line 4422.

In the example of FIG. 4, before the tree scan for process B completes (but after the tree scan for process A has ended), a third process C requests a scan. Thus the intermediate key at this point is recorded as key $k_C$, and the scan for the process C begins at the key $k_{iC+1}$. The tree scan for process C includes a first partial traversal from the key $k_{iC+1}$ to the tree ending location $k_{max}$ as represented by the line 4441, and a second partial traversal from the tree beginning location (corresponding to $k_{min}$) to the tree intermediate key location $k_{iC}$ as represented by the line 4442. Indeed, any number of processes can jump on a carousel service instance that is still scanning on behalf of a process. When there are no processes remaining (e.g., the last system process to join has gotten off the carousel service), the carousel service goes into an idle state.

Figure 5:
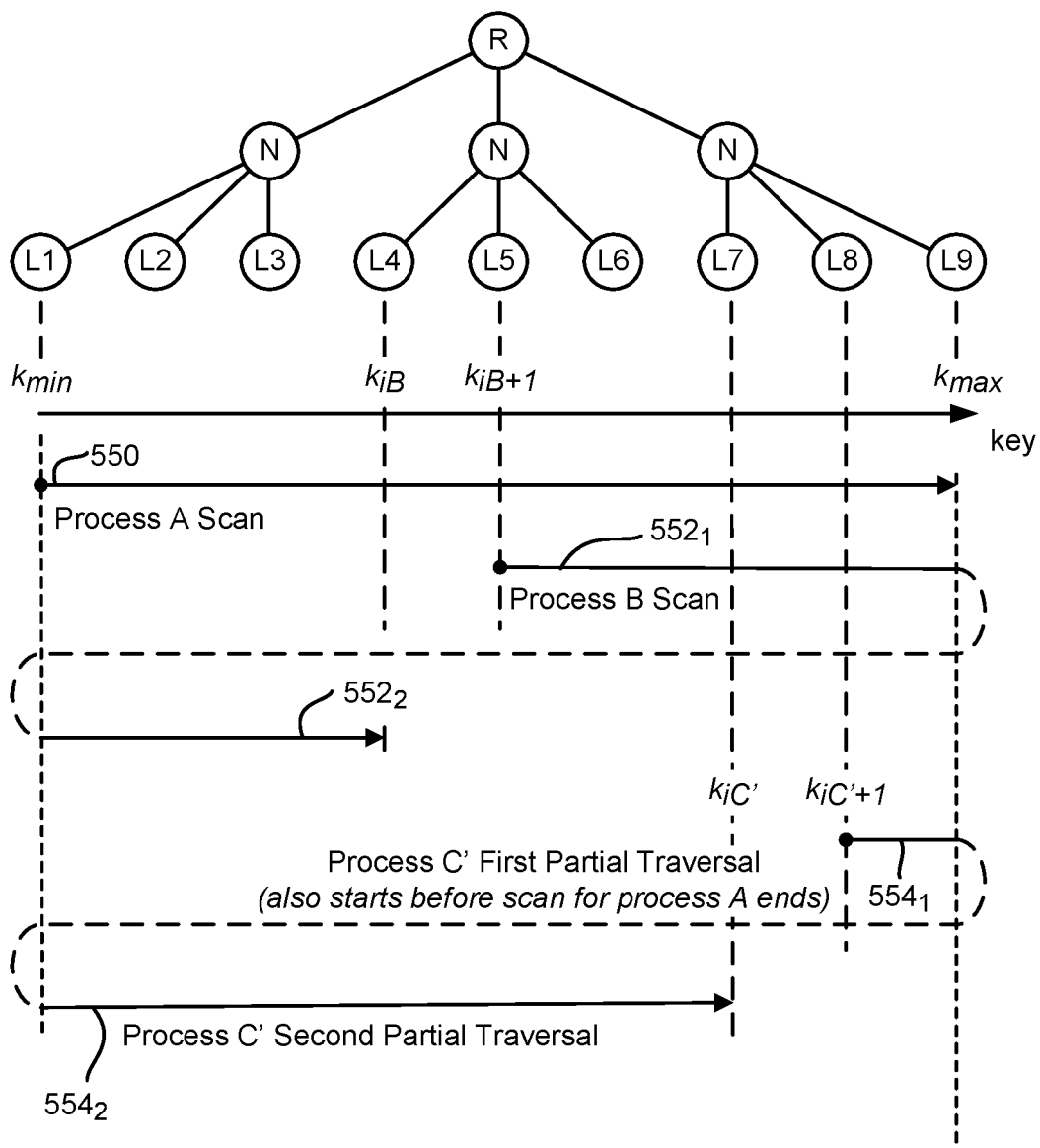

Note that as shown in a similar example in FIG. 5, as long as tree scanning is being performed for process B (or any process), it does not matter whether a third process C' starts before the process A ends. Indeed, when a first partial traversal such as represented by the line 5541 starts for a new process C', the intermediate key is based on the current key being visited, shown in FIG. 5 as $k_{iC'}$, with in parallel scanning continuing until $k_{max}$ for the three processes A, B and C. Indeed, leaves L8 and L9 are visited only once for the three processes A, B and C.

The second partial traversal (line 5542) for the process C' is from $k_{min}$ to $k_{iC'}$. Thus, in FIG. 4, tree traversal for three processes was occurring in parallel until the scan for process A ended, with parallel traversal (of leaves L1 to L4) for two processes occurring until the scan for process B ended (at $k_{iB}$). As can be seen, particularly with large trees typically used in practice, a significant number of keys can be visited in parallel when multiple processes request a scan of the same tree while a carousel service scan of that tree is already ongoing.

Figure 6:
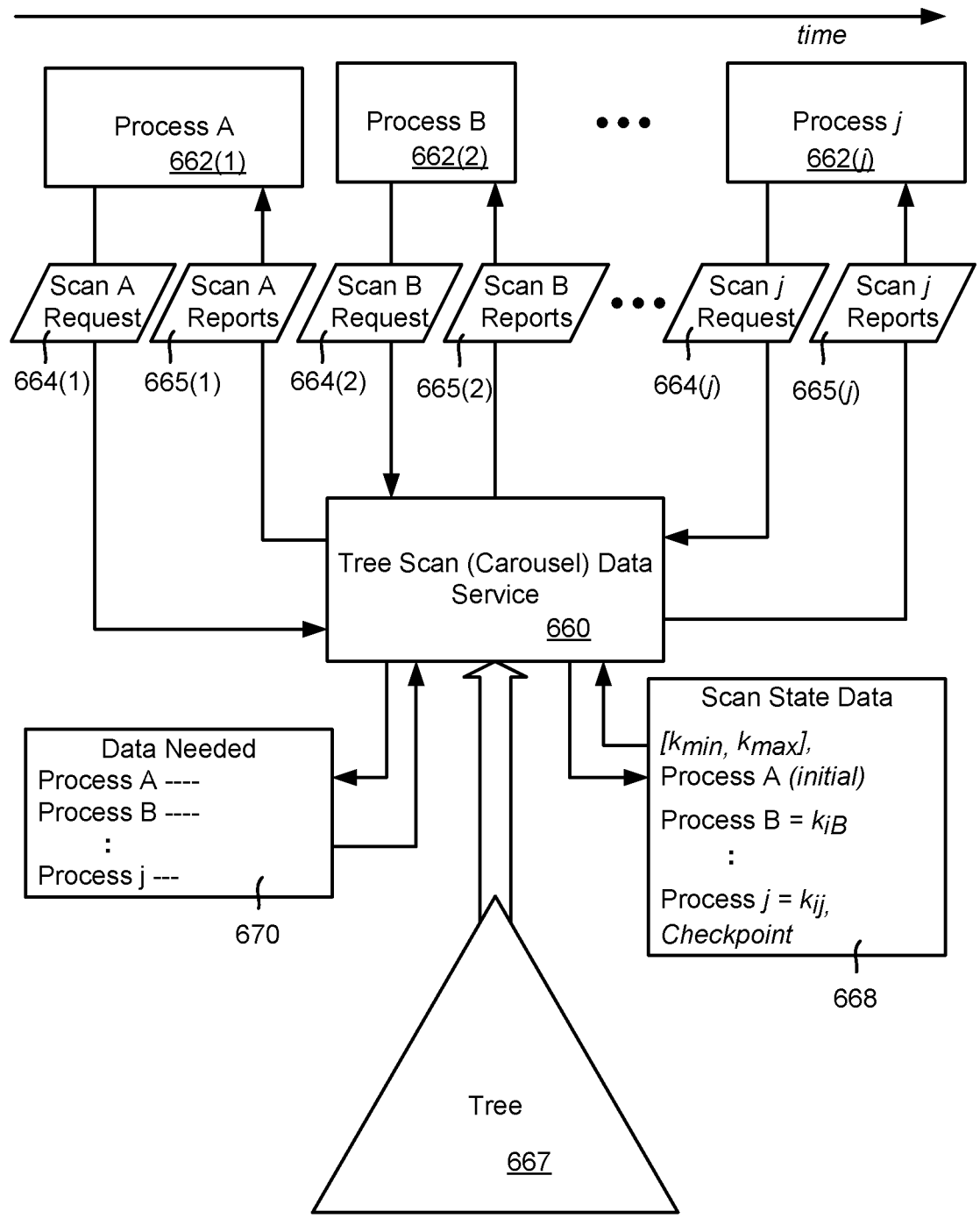
FIG. 6 is a block diagram representation of components and data that facilitate joint scanning of tree elements of a tree, in accordance with various aspects and implementations of the subject disclosure.

FIG. 6 summarizes some of the various aspects in a block diagram. A tree scan/carousel data service 660 is idle until a system process A 662(1) needs to run a scan. The carousel service 660 starts tree traversal when a system process A 662(1) requests a scan (block 664(1)), returning relevant reports 665(1) as tree elements are visited in a tree 667. The carousel service 660 continues tree traversal, visiting tree elements of the tree 337 in parallel as described herein when a system process B 662(2) requests a scan (block 664(2)), returning relevant reports 665(2) as tree elements are visited, and so on up to some system process j. Note that depending on the need of the process, rather than report as tree elements are visited, a single report of the relevant data can be returned when a full scan is complete.

The carousel data service 660 maintains information of the scan as scan state data 668, including the tree beginning location, such as $k_{min}$ (or the root location to get to $k_{min}$) and the tree ending location $k_{max}$, as well as any intermediate points (e.g., $k_{iB}$ to $k_{ij}$) that are needed for later-started processes. The carousel data service 660 also can maintain a checkpoint as needed, as described with reference to FIG. 7.

In addition, the carousel data service 660 can maintain (or access from a stored location) information 670 about the type of data needed by a given process. Indeed, while the carousel service 660 traverses a tree 667, such as a tree or subtree specified by or corresponding to a particular process, in one implementation the carousel service 660 reports to the currently active system processes only with data relevant to each particular process. Note that different processes may need different types of data from a tree scan depending on the process and its purpose of the scan.

By way of some examples, certain directory trees such as the object table are regularly scanned for various different purposes. For instance, object table trees may be scanned to detect unused chunks for user data (by a corresponding repository garbage collector), to detect unused chunks for trees, and to rebuild filters (e.g., Bloom filters) associated with object table trees to accelerate tree search operation; (Bloom filters normally degrade over time thus at times it is beneficial to rebuild them). Other tree scans are performed to assure consistency between object table trees and other directory table trees; for instance, ECS maintains listing table (a type of directory table) trees, which contain information for an object's listing, and it is possible to have an object that exists in only one directory table, object table or listing table. Data storage systems normally have self-healing processes/scanners that detect such inconsistent conditions and resolve them. Other tree scans, including for purposes still in development, can benefit from the technology described herein.

Thus, the data to be returned via a scan can be dependent on the process. As one example, what a Bloom filter refresher process needs is the keys in tree leaves, whereas a repository garbage collector needs system metadata associated with keys, including the location of user data. Thus, in one implementation, system processes can specify what data each one needs from the carousel data service, whereby only the data that is needed for currently active system processes needs to be read from a hard drive and parsed.

As described herein, once a carousel service starts, the carousel service does not stop until a last system process (e.g., one that has joined during an ongoing scan) has completed. A carousel service starts from the beginning of its tree, (although in alternative implementations it is feasible to start at a beginning tree location anywhere in the tree), and when another system process needs to be served by an already revolving (scanning) carousel service, the carousel service does not restart but continues its revolution from its current location. Each system process gets off of a carousel service after having one lap over the tree elements. If a carousel service reaches the end of its tree and there is still a system process that needs to complete its lap, the carousel service restarts from the beginning until a tree ending point (e.g., based on the intermediate tree location of the scanning service where that remaining system process requested joining). Therefore, while a carousel service starts from the beginning, the carousel service can stop at any appropriate point, e.g. at or near a middle of a tree.

Note that this means that the order of the keys or other tree data that a given system process receives from a carousel service is not necessarily from tree start to finish, but rather the ordering is broken at the moment the carousel service crosses a lap border and skips back from the tree ending point (e.g., maximal key value) to the tree beginning point (e.g., minimal key value). This is not a problem for known system processes in ECS which only need to have the tree elements/keys completely visited regardless of order. Notwithstanding, if exact tree start-to-end order is needed by some other process, a separate scan that does not use an already running carousel service can be performed, at the cost of resource consumption.

Tree scanning based on fixed data (e.g., in a "stop-the-world" mode) may not be an option in all scenarios, in part because system processes need to keep track and handle create/update/delete requests that are received (and get journaled) during tree scanning. Nevertheless, in some instances it may acceptable to ignore new tree versions that appear during tree scanning, e.g., a carousel service may use one tree version between the moments the carousel service starts and finishes. Conversely, the efficiency of system processes may decrease as a tree version with which the processes work gets older. Moreover, as set forth above, a carousel service may run without stopping as processes continue to join, in theory forever, or in practice at least for a long time.

Therefore, one or more implementations described herein are designed to have a carousel service jump to a new tree version when that the new tree version is available. This is based on the carousel service working with an ordered stream of keys (although not necessarily an unbroken ordering as described herein).

Figure 7:
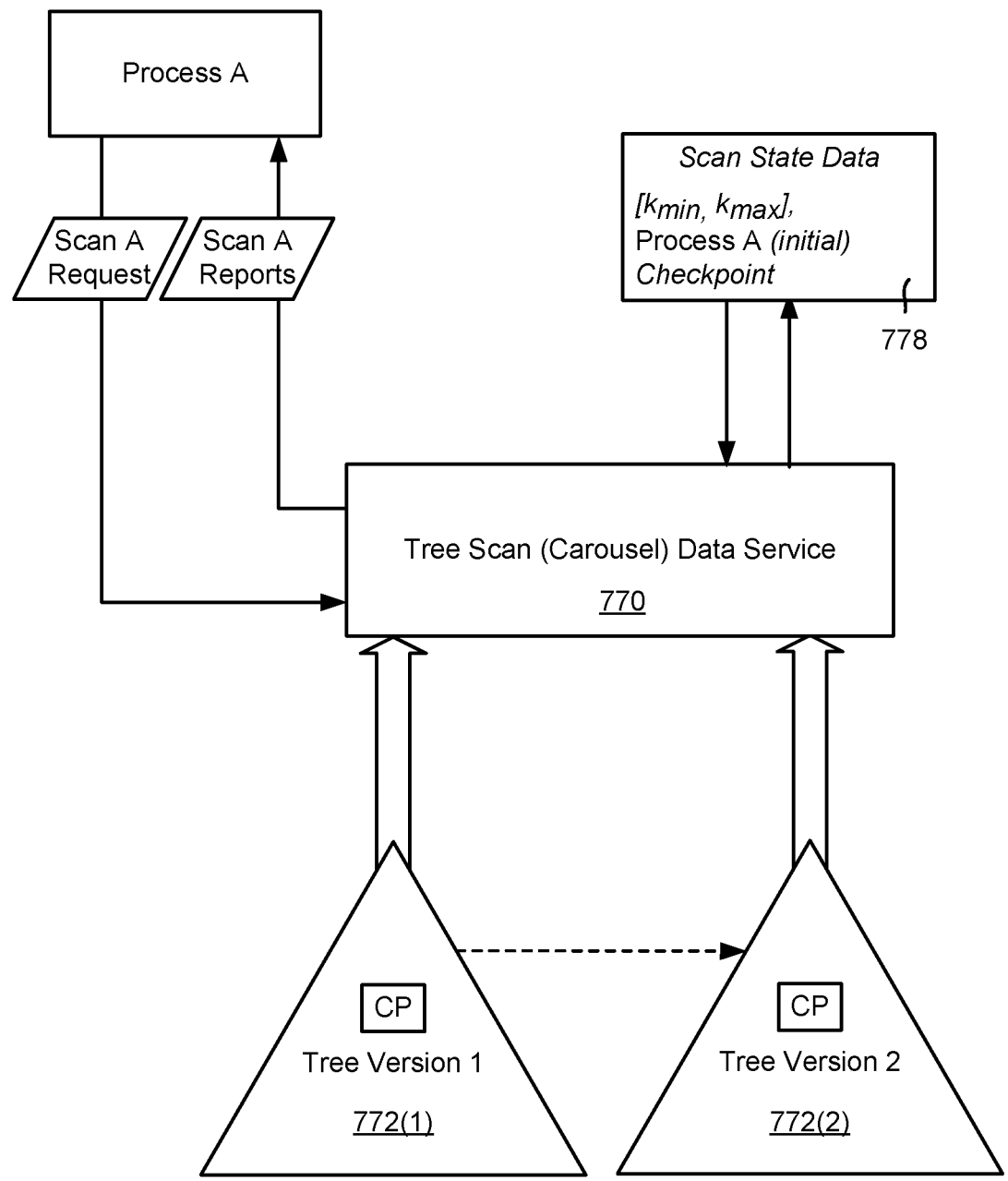
FIG. 7 is a block diagram representation of components and data that facilitate changing tree versions while scanning tree elements, in accordance with various aspects and implementations of the subject disclosure.

As shown in FIG. 7, a carousel service 770 uses a last key it handled for a tree version 772(1) as a checkpoint CP. When the carousel service 770 jumps to a new tree version 772(2), the carousel service 770 resumes traversal starting with a key that is a next key after the corresponding checkpoint CP. Note that although only one process A is shown in FIG. 7, the checkpoint is the same for more than one process, and is shown as being maintained in the scan state data 778.

Note that a key saved as a checkpoint in one version can be deleted in the new tree version 772. In such an instance, traversal resumes starting with the key that would be a next one after a checkpoint, as if the checkpoint was still present in the new key version.

In the event that there is no next key following a checkpoint, the traversal is resumed from a tree beginning, e.g., from the tree's smallest key. If there is no process remaining that needs to resume the traversal from the smallest key (e.g., there was only one process on the carousel and the traversal already scanned the smallest key for that process), the scan ends and the carousel service can go into its idle state.

Figure 8:
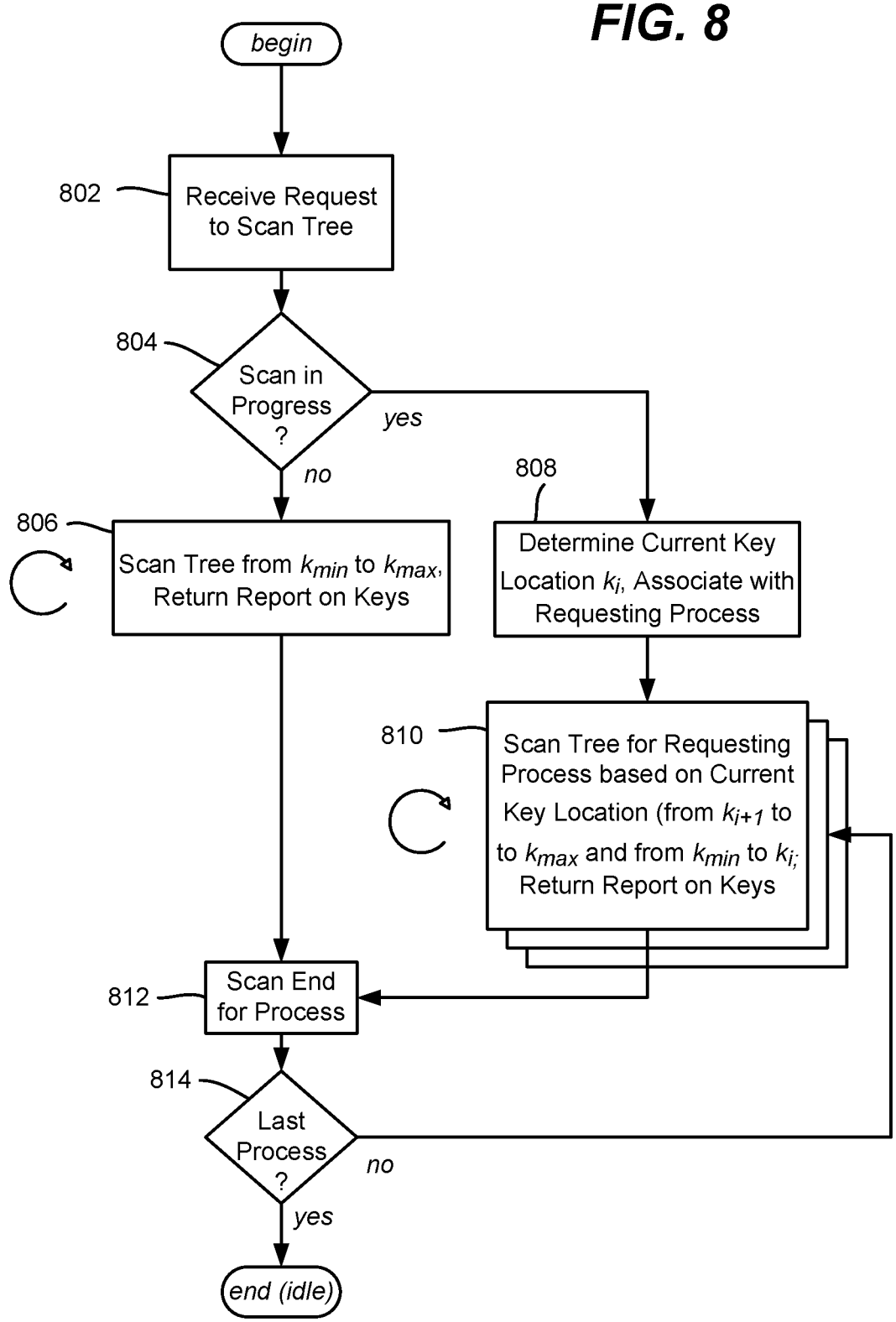
FIG. 8 is a flow diagram representing example operations related to a scanning (carousel) service jointly scanning a tree on behalf of multiple processes, in accordance with various aspects and implementations of the subject disclosure.

FIG. 8 summarizes example operations related to parallel scanning, beginning at operation 802 when a process requests a scan of a tree on behalf of the process. If at operation 804 the tree scanning carousel service is idle, that is there is no scanning of the tree already in progress, operation 806 begins a scan, e.g., from the tree beginning (corresponding to $k_{min}$) to the tree end ($k_{max}$), reporting back to the requesting process as the tree elements are visited. When the tree end is reached, operation 812 ends the scan for that process, and if there is no other process operation 814), the carousel tree scanning service returns to its idle state. Otherwise the scanning continues (for at least one process) at operation 810.

More particularly, while operation 806 is being performed (before the tree end ($k_{max}$) is reached for the initial process, another request to scan the tree can be received at operation 802. This time, operation 804 determines that a scan is in progress, and thus operation 808 is performed, which records the current location $k_i$ and associates that location with the newly requesting (e.g., second) process. Operation 810 scans the tree for the second process from $k_{i+1}$ to $k_{max}$ and from $k_{min}$ to $k_i$ as described herein. When the scan for that process ends, operation 812 ends the scan for that process, and if there is no other process operation 814), the carousel tree scanning service returns to its idle state. Otherwise the scanning continues (for at least one process) at operation 810.

As is understood, while scanning is occurring at operation 806 and/or operation 810, a new (e.g., third, fourth and so on) process can request scanning of the tree at operation 802. Thus, while any scan is still occurring as detected by operation 804, operations 808 and 810 are performed for the new process, with an appropriate intermediate key (e.g., a different $k_j$) recorded and used for that process. When the scan ends for the last process as detected via operation 814, the carousel tree scanning service returns to its idle state. Note that it is possible for two processes or more processes to request scanning at substantially the same time, and thus the intermediate key may be the same for those two or more processes. It is also possible for two or more processes to request scanning at substantially the same time while the carousel service is idle, in which event each of those processes will have parallel scanning performed, e.g., from $k_{min}$ to $k_{max}$.

Figure 9:
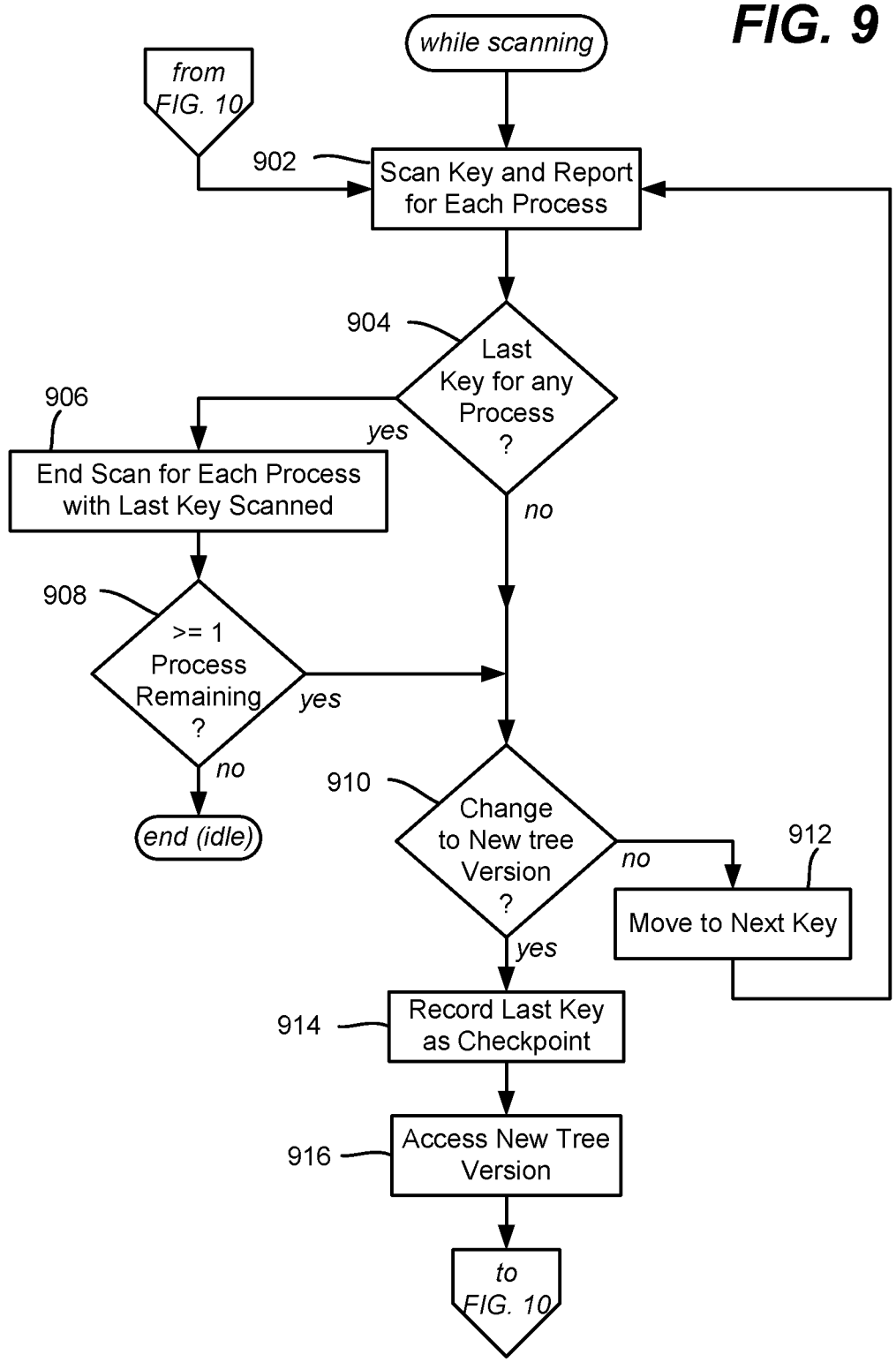
FIGS. 9 and 10 comprise a flow diagram representing example operations that a scanning (carousel) service can perform while scanning elements of a tree, in accordance with various aspects and implementations of the subject disclosure.
Figure 10:
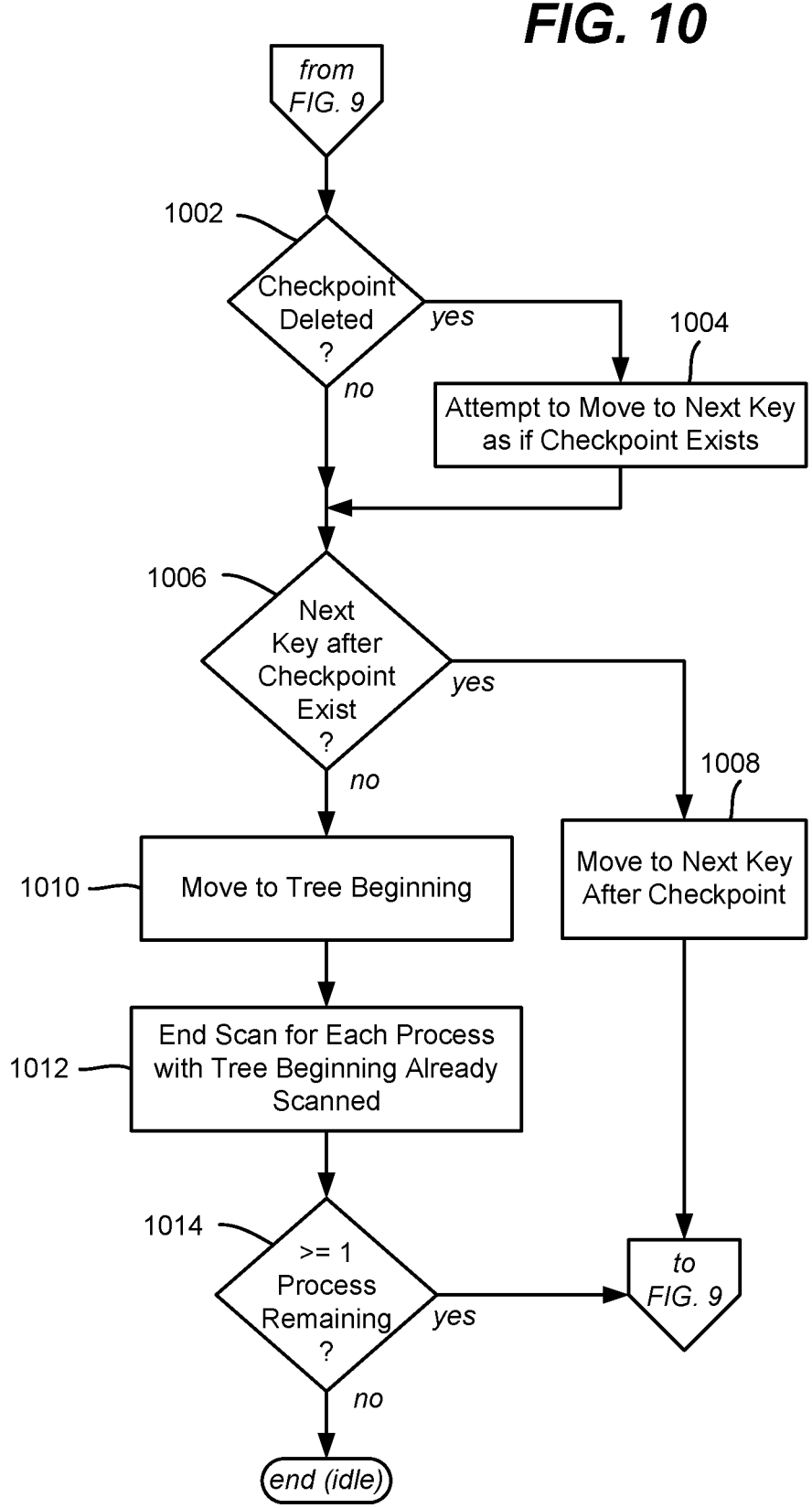

FIGS. 9 and 10 show example operations that can be performed by the carousel tree scanning service during the scanning operations. Operation 902 represents visiting a current key and reporting on that visit as appropriate to each relevant process.

Operation 904 evaluates whether the key just visited was the last key for any process. If so, operation 906 ends the scan for that process or processes, and operation 908 evaluates whether at least one process remains with respect to the tree scanning. If not, the carousel tree scanning service goes into its idle state.

If scanning is taking place for at least one process at operation 908, or no process has ended at operation 904, operation 910 evaluates whether the tree version has changed. If not, operation 912 moves to the next key in the current tree version, which returns to operation 902 to scan and report on that key as described herein.

If a new tree version is detected, operation 914 records the current key as a checkpoint, e.g., the last key visited; (the carousel tree scanning service already has this location information, and thus a formal "recording" of the checkpoint in a separate location may not be needed). Note that instead of recording the next key to visit as the checkpoint, in one implementation the last key visited is saved as the checkpoint, because a new key may have been inserted just after the last key visited, whereby this new key will also be visited in the new tree version. Operation 916 represents accessing the new tree version to continue the scanning.

It is possible that in the new tree version the checkpoint (the last key visited) has been deleted as evaluated via operation 1002. If so, operation 1004 attempts to move to the next key as if the checkpoint had not been deleted.

It is also possible that there is no next key, because the end of the tree has been reached. Thus, operation 1006 checks for this state, and if there is a next key, operation 1008 moves to the next key after the checkpoint (whether the checkpoint was deleted or not), and the process continues the scanning and reporting at operation 902 of FIG. 9, using the new tree version.

If the tree end was reached, operation 1010 moves to the tree beginning. If the tree beginning has already been scanned for any process, then scanning is ended for that process at operation 1012. If no processes remain as evaluated by operation 1014 after ending the scan for any such process, then scanning of the tree is done and the carousel tree scanning service goes into its idle state. Otherwise scanning resumes from the beginning of the new tree version at operation 902 of FIG. 9 as described above.

Figure 11:
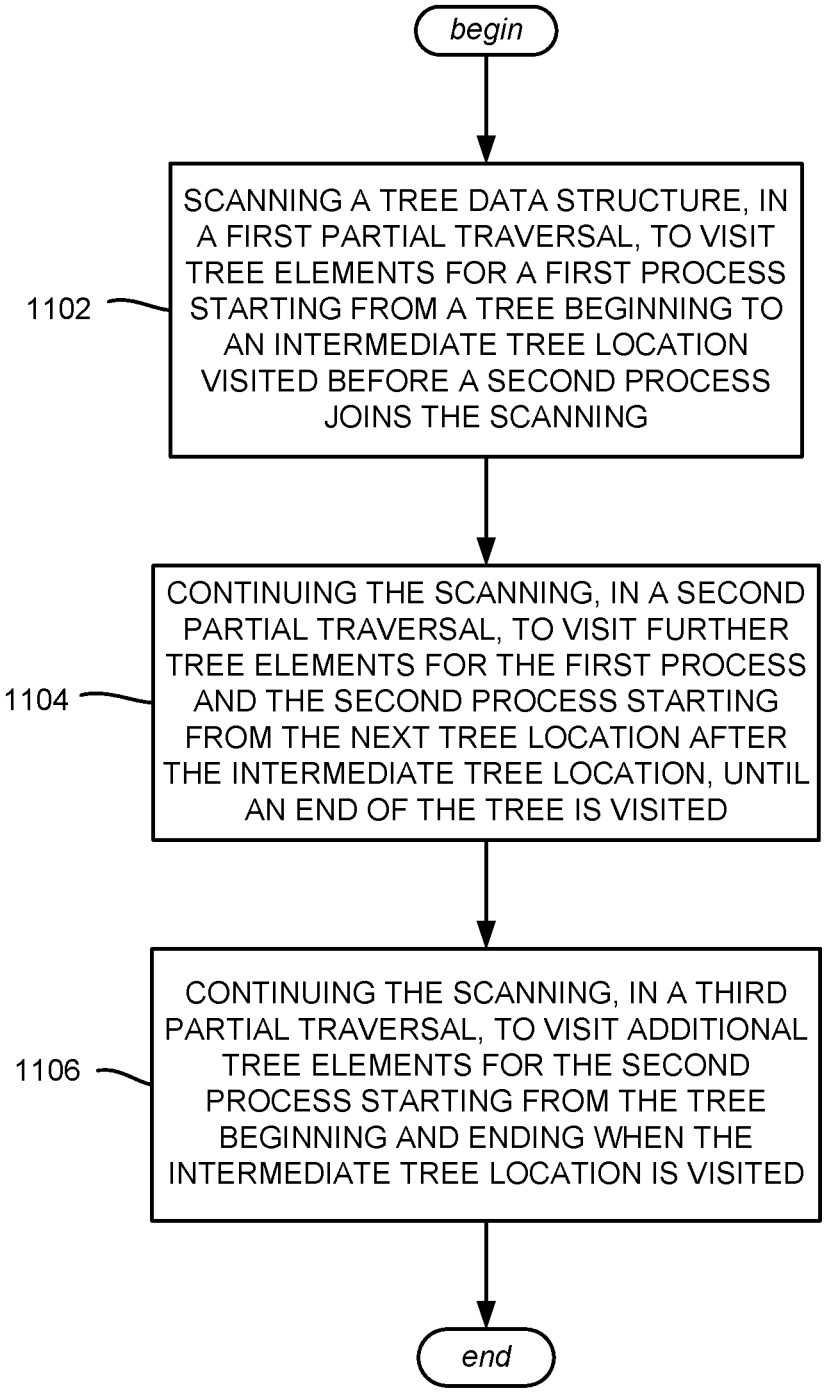
FIG. 11 is a flow diagram showing example operations related to scanning a tree for a first process while a second process joins in the tree scan, in accordance with various aspects and implementations of the subject disclosure.

One or more aspects are represented in FIG. 11, such as of a system comprising a processor, and a memory that stores executable instructions that, when executed by the processor, facilitate performance of operations. Operation 1102 represents scanning a tree data structure, in a first partial traversal, to visit tree elements for a first process starting from a tree beginning to an intermediate tree location visited before a second process joins the scanning. Operation 1104 represents continuing the scanning, in a second partial traversal, to visit further tree elements for the first process and the second process starting from the next tree location after the intermediate tree location, until an end of the tree is visited. Operation 1106 represents continuing the scanning, in a third partial traversal, to visit additional tree elements for the second process starting from the tree beginning and ending when the intermediate tree location is visited.

The tree data structure can be a first tree data structure version that changes to a second tree data structure version, and further operations can comprise, maintaining a checkpoint corresponding to a last-visited tree element of the first tree data structure version, and resuming the scanning in the second tree data structure version based on the checkpoint.

Resuming the scanning can comprise resuming from a next tree element after the checkpoint.

The checkpoint can correspond to a tree element that has been deleted in the second tree data structure version, and the resuming the scanning can comprise resuming from a next tree element after the checkpoint while presuming the tree element corresponding to the checkpoint had not been deleted.

The tree beginning can be a first tree beginning, and the checkpoint can correspond to a tree element with no next tree element, and resuming the scanning can comprise resuming from a second tree beginning of the second tree data structure corresponding to the continuing the scanning in the third partial traversal.

The tree data structure comprises a directory table of the data storage system. The tree data structure comprises an object table of the data storage system.

Scanning for the first process can scan the object table to detect unused data chunks corresponding to user data or tree data. Scanning for the first process can scan the object table to rebuild a Bloom filter associated with the object table. Scanning for the first process can scan the object table to determine consistency between the object table and another directory table other than the object table.

The scanning can be performed by a data service, the first process can comprise a first client of the data service, and the second process can comprise a second client of the data service.

Figure 12:
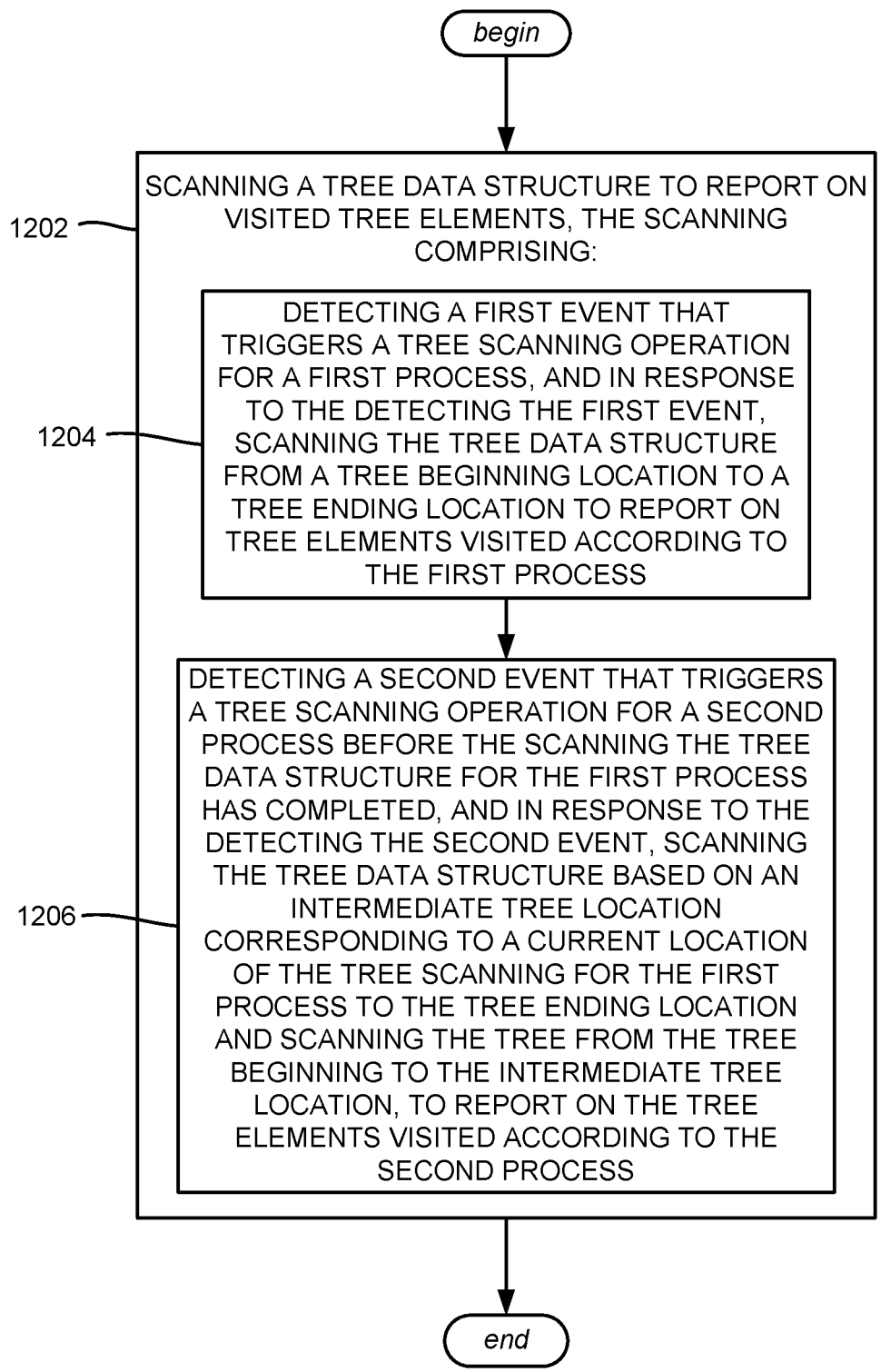
FIG. 12 is a flow diagram showing example operations related to scanning a tree for a first process while a second process joins in the tree scan at an intermediate tree location, in accordance with various aspects and implementations of the subject disclosure.

One or more aspects are represented in FIG. 12, such as example operations of a method. Operation 1202 represents scanning a tree data structure to report on visited tree elements. The scanning can comprise operation 1204, which represents detecting a first event that triggers a tree scanning operation for a first process, and in response to the detecting the first event, scanning the tree data structure from a tree beginning location to a tree ending location to report on tree elements visited according to the first process. The scanning can further comprise operation 1206, which represents detecting a second event that triggers a tree scanning operation for a second process before the scanning the tree data structure for the first process has completed, and in response to the detecting the second event, scanning the tree data structure based on an intermediate tree location corresponding to a current location of the tree scanning for the first process to the tree ending location and scanning the tree from the tree beginning to the intermediate tree location, to report on the tree elements visited according to the second process.

The intermediate tree location can be a first intermediate tree location, and aspects can comprise detecting a third event that triggers a tree scanning operation for a third process before the scanning the tree for the second process has completed, and in response the detecting the third event, scanning the tree based on a second intermediate tree location corresponding to a current location of the tree scanning for the second process to the tree ending location and scanning the tree from the tree beginning to the second intermediate tree location, to report on the tree elements visited according to the third process. Aspects can comprise detecting a fourth event that triggers a tree scanning operation for a fourth process before the scanning the tree for the third process has completed, and in response the detecting the fourth event, scanning the tree based on a third intermediate tree location corresponding to a current location of the tree scanning for the third process to the tree ending location and scanning the tree from the tree beginning to the third intermediate tree location, to report on the tree elements visited according to the fourth process.

The tree data structure can correspond to a first tree data structure version that changes to a second tree data structure version; aspects can comprise maintaining a checkpoint corresponding to a last-visited tree element of the first tree data structure version, and resuming the scanning operation in the second tree data structure version based on the checkpoint.

The checkpoint can correspond to a tree element that has been deleted in the second tree data structure version, and resuming the scanning operation can comprise resuming from a next tree element after the checkpoint as if the tree element corresponding to the checkpoint had not been deleted.

The checkpoint can correspond to a tree element with no next tree element, and resuming the scanning can comprise resuming from the tree beginning.

Figure 13:
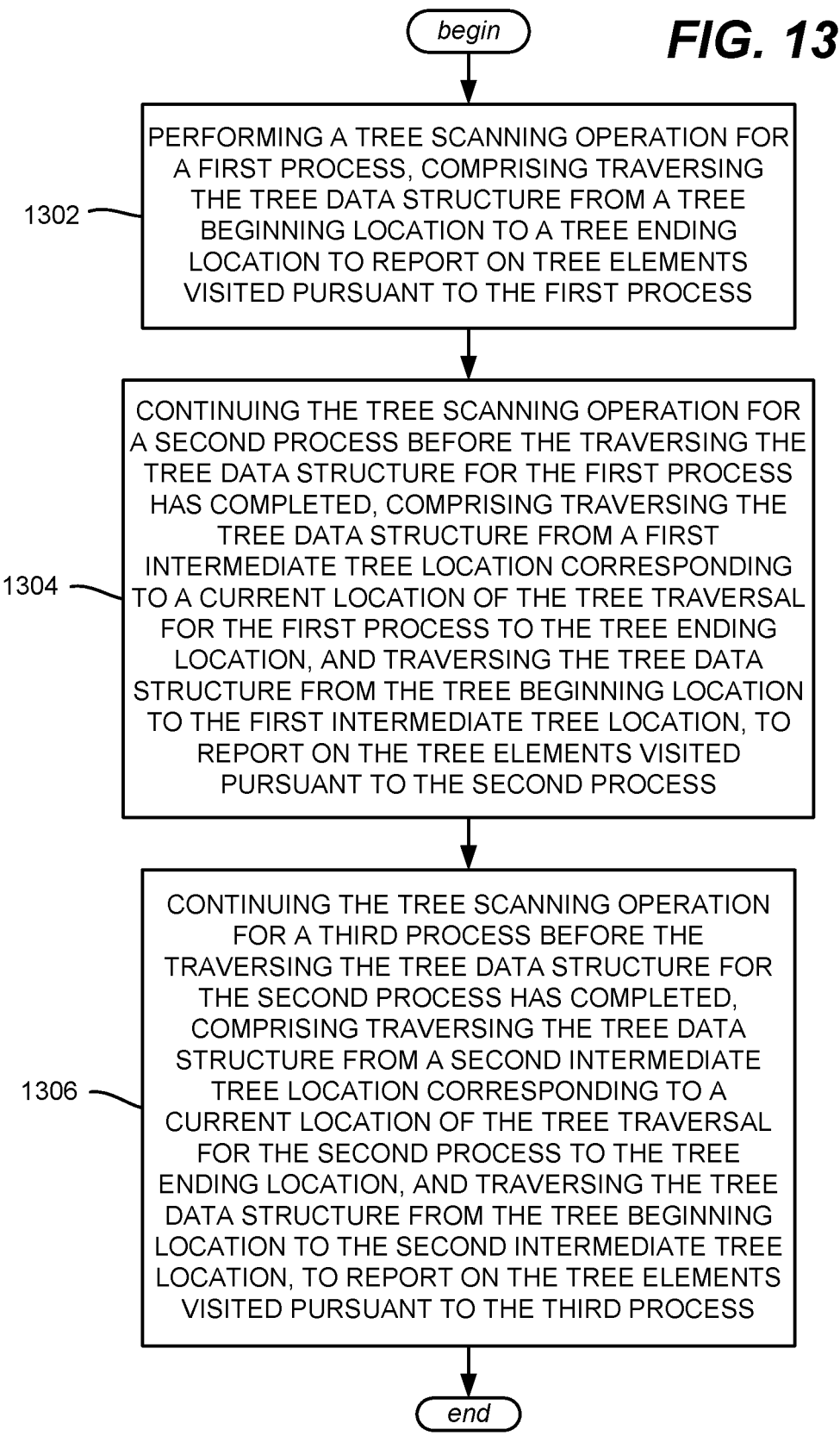
FIG. 13 is a flow diagram showing example operations related to scanning a tree for a first process while a second process joins in the tree scan at an intermediate tree location, and a third process joins in the tree scan at another intermediate tree location, in accordance with various aspects and implementations of the subject disclosure.

One or more aspects, such as implemented in a machine-readable storage medium, comprising executable instructions that, when executed by a processor of a data storage system, can be directed towards operations exemplified in FIG. 13. Example operation 1302 represents performing a tree scanning operation for a first process, comprising traversing the tree data structure from a tree beginning location to a tree ending location to report on tree elements visited pursuant to the first process. Example operation 1304 represents continuing the tree scanning operation for a second process before the traversing the tree data structure for the first process has completed, comprising traversing the tree data structure from a first intermediate tree location corresponding to a current location of the tree traversal for the first process to the tree ending location, and traversing the tree data structure from the tree beginning location to the first intermediate tree location, to report on the tree elements visited pursuant to the second process. Example operation 1306 represents continuing the tree scanning operation for a third process before the traversing the tree data structure for the second process has completed, comprising traversing the tree data structure from a second intermediate tree location corresponding to a current location of the tree traversal for the second process to the tree ending location, and traversing the tree data structure from the tree beginning location to the second intermediate tree location, to report on the tree elements visited pursuant to the third process.

The tree data structure can correspond to a first tree data structure version that changes to a second tree data structure version, and further operations can comprise maintaining a checkpoint corresponding to a last-visited tree element of the first tree data structure version, and resuming the scanning operation in the second tree data structure version based on the checkpoint.

The checkpoint can correspond to a tree element that has been deleted in the second tree data structure version, and the resuming the scanning operation can comprise resuming from a next tree element after the checkpoint and ignoring that the tree element corresponding to the checkpoint had been deleted.

As can be seen, described herein is a technology that facilitates having multiple system processes join a tree scan to visit at least some tree elements simultaneously, thereby reducing multiplication of system resource consumption. The technology allows for processes to obtain only relevant data from visited tree elements, and by visiting at least some elements in parallel, reduces system resource usage while being practical to implement.

Figure 14:
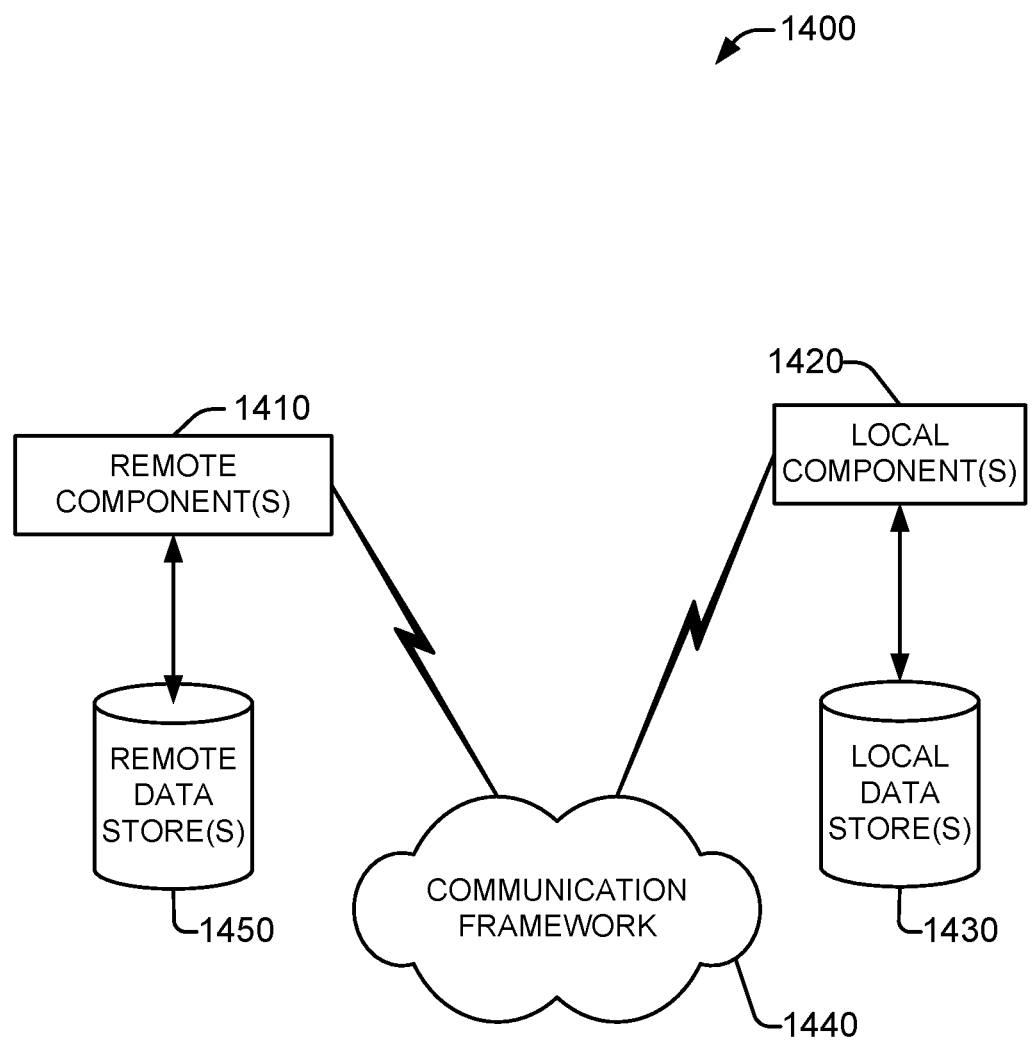
FIG. 14 depicts an example schematic block diagram of a computing environment with which the disclosed subject matter can interact, in accordance with various aspects and implementations of the subject disclosure.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
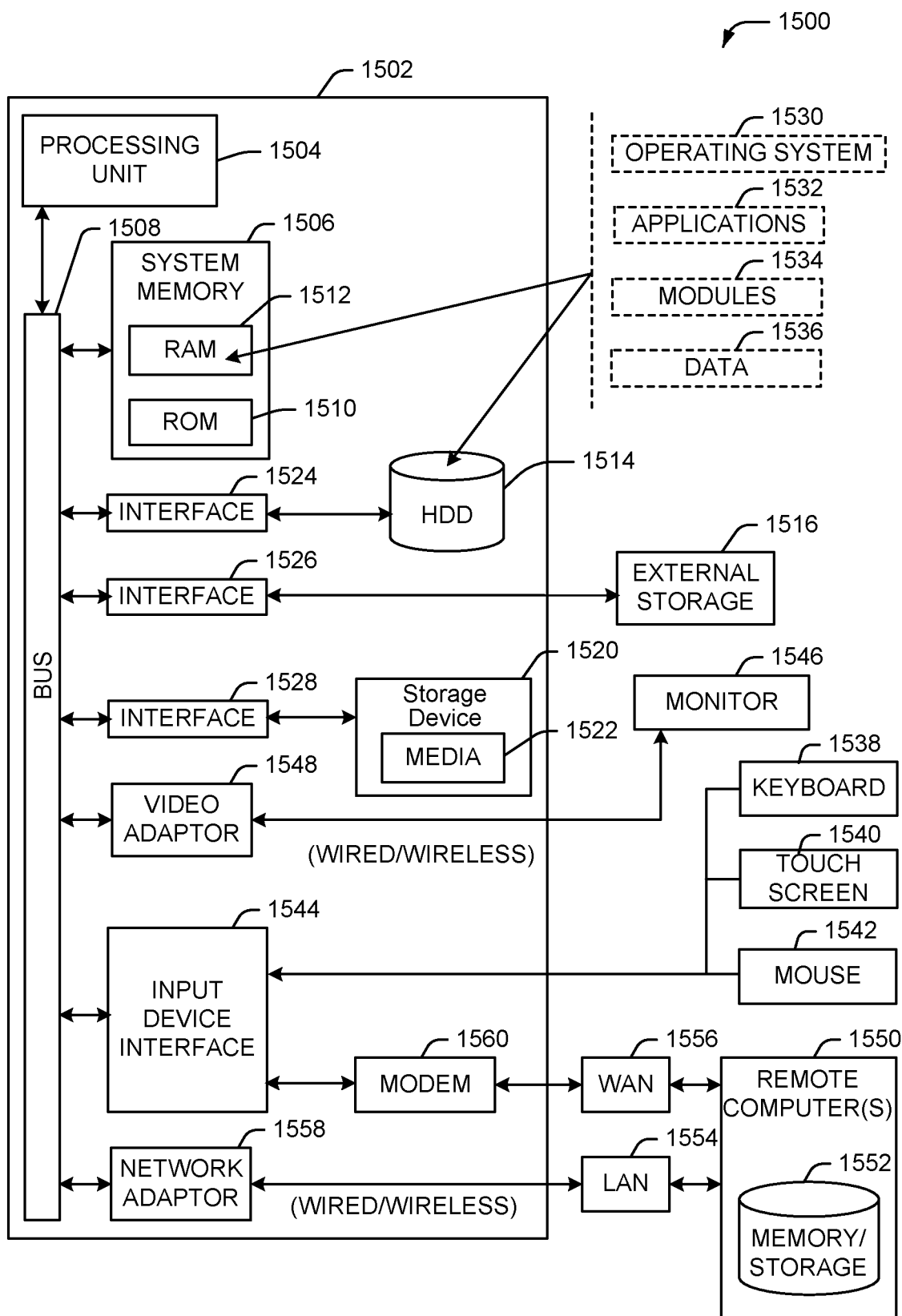
FIG. 15 illustrates an example block diagram of a computing system operable to execute the disclosed systems and methods in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
   a processor; and
   a memory that stores executable instructions that, when executed by the processor of a data storage system, facilitate performance of operations, the operations comprising:
      scanning a first tree data structure, in a first partial traversal, to visit tree elements for a first process starting from a tree beginning to an intermediate tree location visited before a second process joins the scanning;
      continuing the scanning, in a second partial traversal, to visit further tree elements for the first process and the second process starting from the next tree location after the intermediate tree location, until an end of the tree is visited;
      continuing the scanning, in a third partial traversal, to visit additional tree elements for the second process starting from the tree beginning and ending the scanning when the intermediate tree location is visited; and
      after the first tree data structure version has changed to a second tree data structure version, resuming the scanning in the second tree data structure version based on a checkpoint corresponding to a last-visited tree element of the first tree data structure version comprising resuming from a next tree element after the checkpoint while presuming a tree element corresponding to the checkpoint had not been deleted.

2. The system of claim 1, wherein the operations further comprise maintaining the checkpoint corresponding to the last-visited tree element of the first tree data structure version.

3. The system of claim 1, wherein the checkpoint further corresponds to the tree element, and wherein the tree element has been deleted in the second tree data structure version.

4. The system of claim 1, wherein the tree beginning is a first tree beginning, wherein the checkpoint further corresponds to a tree element with no next tree element, and wherein the resuming the scanning comprises resuming from a second tree beginning corresponding to the continuing the scanning in the third partial traversal.

5. The system of claim 1, wherein the tree data structure comprises a directory table of the data storage system.

6. The system of claim 1, wherein the tree data structure comprises an object table of the data storage system.

7. The system of claim 6, wherein the scanning for the first process scans the object table to detect unused data chunks corresponding to user data or tree data.

8. The system of claim 6, wherein the scanning for the first process scans the object table to rebuild a Bloom filter associated with the object table.

9. The system of claim 6, wherein the scanning for the first process scans the object table to determine consistency between the object table and another directory table other than the object table.

10. The system of claim 1, wherein the scanning is performed by a data service, and wherein the first process comprises a first client of the data service, and the second process comprises a second client of the data service.

11. A method, comprising:
  scanning, via a processor of a data storage service, a tree data structure to report on visited tree elements, the scanning comprising:
    detecting a first event that triggers a tree scanning operation for a first process, and in response to the detecting the first event, scanning the tree data structure from a tree beginning location to a tree ending location to report on tree elements visited according to the first process; and
    detecting a second event that triggers a tree scanning operation for a second process before the scanning the tree data structure for the first process has completed, and in response to the detecting the second event, scanning the tree data structure based on an intermediate tree location corresponding to a current location of the tree scanning for the first process to the tree ending location and scanning the tree from the tree beginning to the intermediate tree location, to report on the tree elements visited according to the second process,
  wherein the tree data structure corresponds to a first tree data structure version that changes to a second tree data structure version, and further comprising:
    maintaining a checkpoint corresponding to a last-visited tree element of the first tree data structure version, and
    resuming the scanning operation in the second tree data structure version based on the checkpoint comprising resuming from a next tree element after the checkpoint while presuming a tree element corresponding to the checkpoint had not been deleted.

12. The method of claim 11, wherein the intermediate tree location is a first intermediate tree location, and further comprising detecting a third event that triggers a tree scanning operation for a third process before the scanning the tree for the second process has completed, and in response the detecting the third event, scanning the tree based on a second intermediate tree location corresponding to a current location of the tree scanning for the second process to the tree ending location and scanning the tree from the tree beginning to the second intermediate tree location, to report on the tree elements visited according to the third process.

13. The method of claim 12, further comprising detecting a fourth event that triggers a tree scanning operation for a fourth process before the scanning the tree for the third process has completed, and in response the detecting the fourth event, scanning the tree based on a third intermediate tree location corresponding to a current location of the tree scanning for the third process to the tree ending location and scanning the tree from the tree beginning to the third intermediate tree location, to report on the tree elements visited according to the fourth process.

14. The method of claim 11, wherein the checkpoint further corresponds to a tree element that has been deleted in the second tree data structure version, and wherein the resuming the scanning operation comprises resuming from a next tree element after the checkpoint as if the tree element corresponding to the checkpoint had not been deleted.

15. The method of claim 11, wherein the checkpoint further corresponds to a tree element with no next tree element, and wherein the resuming the scanning comprises resuming from the tree beginning.

16. A non-transitory machine-readable medium, comprising executable instructions that, when executed by a processor of a data storage system, facilitate performance of operations, the operations comprising:
  performing a tree scanning operation for a first process, comprising traversing the tree data structure from a tree beginning location to a tree ending location to report on tree elements visited pursuant to the first process;
  continuing the tree scanning operation for a second process before the traversing the tree data structure for the first process has completed, comprising traversing the tree data structure from a first intermediate tree location corresponding to a current location of the tree traversal for the first process to the tree ending location, and traversing the tree data structure from the tree beginning location to the first intermediate tree location, to report on the tree elements visited pursuant to the second process; and
  continuing the tree scanning operation for a third process before the traversing the tree data structure for the second process has completed, comprising traversing the tree data structure from a second intermediate tree location corresponding to a current location of the tree traversal for the second process to the tree ending location, and traversing the tree data structure from the tree beginning location to the second intermediate tree location, to report on the tree elements visited pursuant to the third process,
  wherein the tree data structure corresponds to a first tree data structure version that changes to a second tree data structure version, and wherein the operations further comprise maintaining a checkpoint corresponding to a last-visited tree element of the first tree data structure version, and resuming the scanning operation in the second tree data structure version based on the checkpoint comprising resuming from a next tree element after the checkpoint while presuming a tree element corresponding to the checkpoint had not been deleted.

17. The non-transitory machine-readable medium of claim 16, wherein the checkpoint further corresponds to a tree element that has been deleted in the second tree data structure version, and wherein the resuming the scanning operation comprises resuming from a next tree element after the checkpoint and ignoring that the tree element corresponding to the checkpoint had been deleted.

18. The non-transitory machine-readable medium of claim 16, wherein the tree data structure comprises at least one of a directory table of the data storage system or an object table of the data storage system.

19. The non-transitory machine-readable medium of claim 16, wherein the tree data structure comprises an object table of the data storage system, and wherein the performing the tree scanning operation for the first process comprises at least one of:

scanning the object table to detect unused data chunks corresponding to user data or tree data, scanning the object table to rebuild a Bloom filter associated with the object table, or scanning the object table to determine consistency between the object table and another table other than the object table.

20. The non-transitory machine-readable medium of claim 16, wherein the tree scanning operation is performed by a data service, wherein the first process comprises usage of a first client of the data service, and wherein the second process comprises usage of a second client of the data service.

* * * * *